Figure 1:
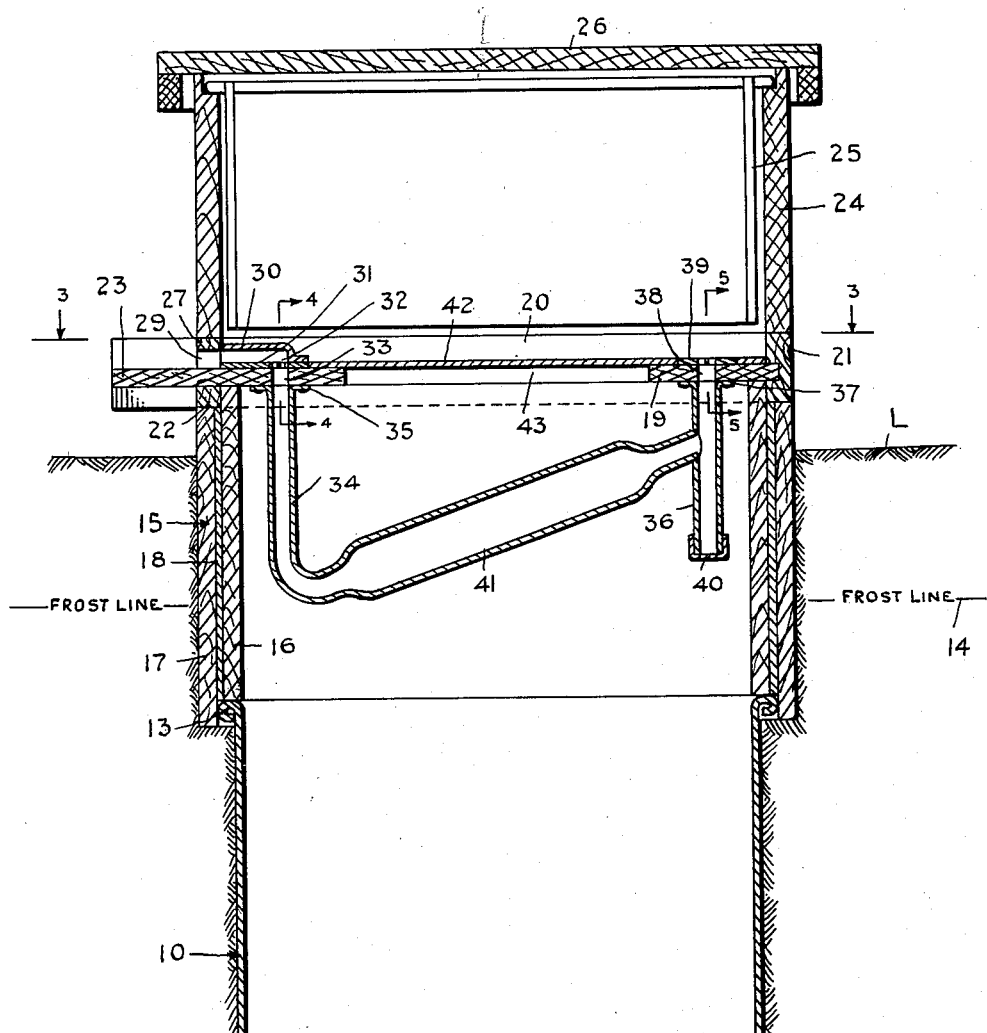

Feb. 17, 1953 C. S. BOWEN 2,628,374
BEEHIVE WITH HEATING AND VENTILATING MEANS
Filed April 2, 1951 2 SHEETS—SHEET 1

INVENTOR
CLARENCE STEELE BOWEN
BY
ATTORNEY

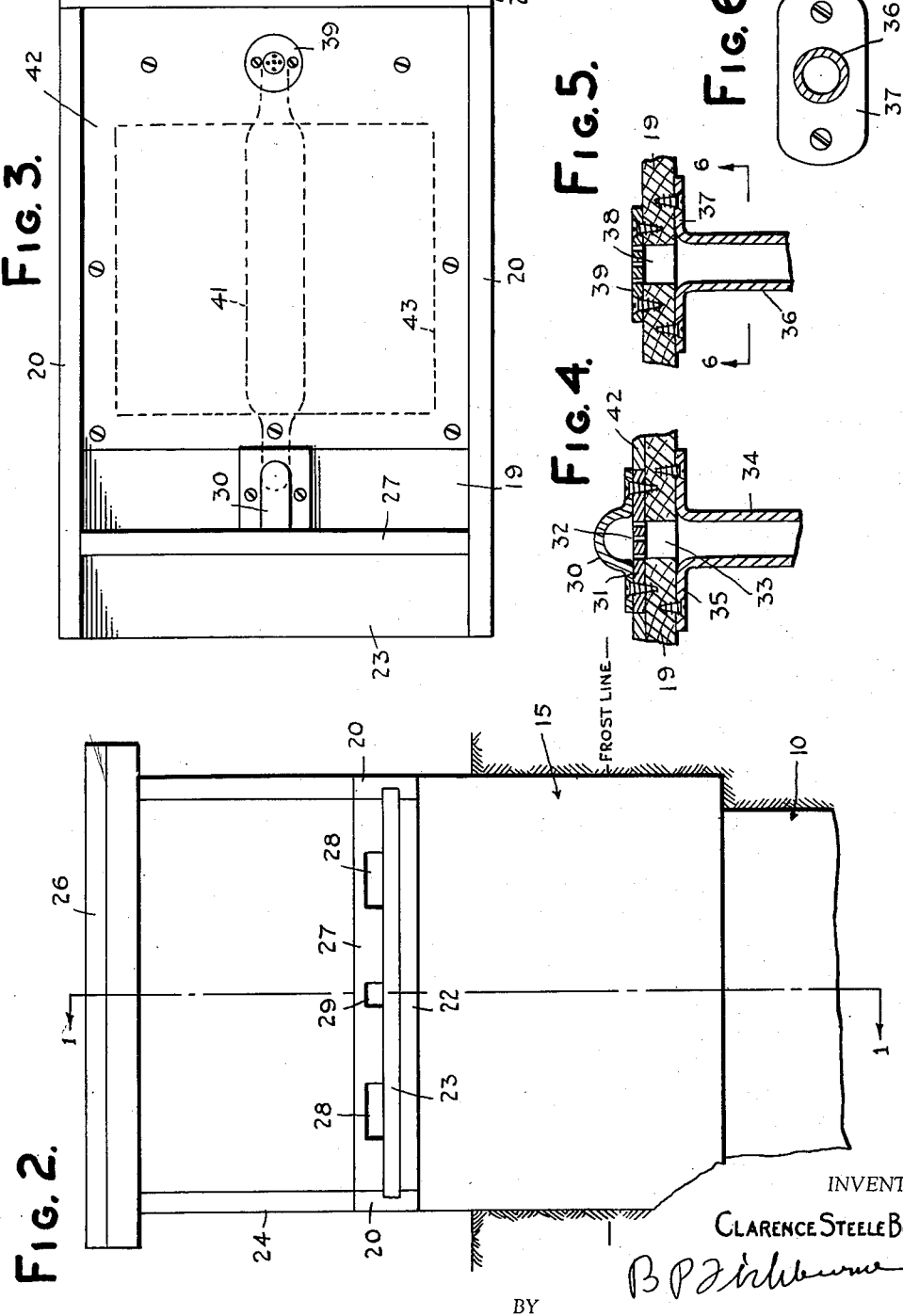

Patented Feb. 17, 1953

2,628,374

UNITED STATES PATENT OFFICE 2,628,374

BEEHIVE WITH HEATING AND VENTILATING MEANS

Clarence S. Bowen, Greenville, S. C.

Application April 2, 1951, Serial No. 218,765

12 Claims. (Cl. 6—1)

My invention relates to bee hives.

Bees are adapted by nature, and fitted by well built hives, properly protected by wind-breaks to winter in reasonably cold climates. Overheating of the hive causes much harm, because the bees become restless, and are deceived by the excess heat into believing that the weather is warm outside, and fly from the hive, to become chilled, have their wings paralyzed by the cold, and never to return. Hence, it is important that any bee hive heater not function excessively, cease operating completely when the temperature in the hive reaches approximately 40 degrees F. above zero—subterranean temperature—and that its action be absolutely dependable.

Cellar wintering of bees is unsatisfactory, requiring considerable labor and expense. A dry cellar must be provided, and the bees are denied the benefit of helpful flights on warm days.

Insulating hives on their summer stands with packing material, or otherwise, is not the answer to the wintering problem, since the bees do not create sufficient heat outside of the cluster to keep the hive chamber warm in frigid regions, and the hive chamber sweats and becomes damp, unless an air opening is provided at or near the top of the hive to allow the moisture to escape. Such an opening, while allowing the moisture to escape, also allows whatever heat there is in the hive to escape.

The practice of many bee keepers in very cold regions of killing their bees in the fall and replacing them the following spring with bees purchased from bee keepers in warmer localities is impractical, being expensive, and providing weaker colonies than those successfully overwintered.

Impractical also is the method of ventilating the hive by providing an air outlet near the top of the hive. The warmest air in the hive is near the top, and drawing this air out robs the hive of needed warmth.

Accordingly, a primary object of the invention is to overcome the above-mentioned difficulties, by the provision in a bee hive of means to heat and ventilate the same, which means are rendered active and inactive by the temperature of the hive.

A further object is to provide bee hive warming and ventilating means which utilize the warmth of the earth beneath the hive to warm the air and circulate the same through the hive.

A still further object of the invention is to provide in connection with a bee hive, apparatus for heating and ventilating the same which is highly simplified in construction, sturdy and durable, and relatively cheap to manufacture.

Other objects and advantages of the invention will be apparent during the course of the following description.

Figure 7:
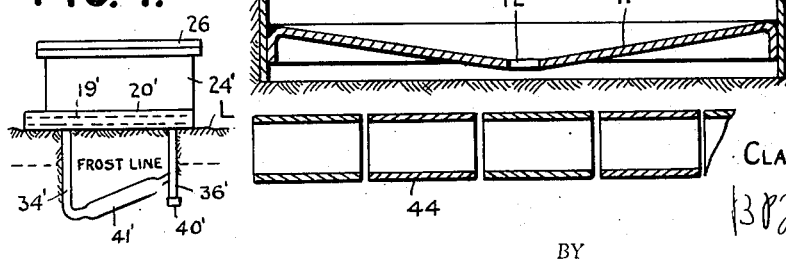

In the accompanying drawings, forming a part of this application, and in which like numerals are employed to designate like parts throughout same, Figure 1 is a central vertical section through a bee hive embodying my invention taken on line 2—2 of Fig. 1, Figure 2 is a front side elevation of the same, Figure 3 is a plan view taken on line 3—3 of Figure 1 with the upper section or hive body removed, Figure 4 is an enlarged fragmentary vertical section taken on line 4—4 of Figure 1, Figure 5 is a similar section taken on line 5—5 of Figure 1, Figure 6 is a horizontal section taken on line 6—6 of Figure 5, and, Figure 7 is a side elevation on a reduced scale, partly diagrammatic, of a bee hive embodying a modification of the invention.

In the drawings, where for the purpose of illustration is shown a preferred embodiment of my invention, the numeral 10 designates a warm well casing which may be formed of heavy gage galvanized sheet metal, or some other good heat conducting material. The casing 10 has its upper end open, and is preferably rectangular in horizontal cross section. The casing 10 has a downwardly sloping bottom 11 having a central drain opening 12 formed therein. At its upper end, the warm well casing 10 may be provided with an external marginal bead or flange 13, as shown. The warm well casing 10 is disposed in the bottom of an opening formed in the ground, and has its upper end located well below the frost line 14.

An intermediate insulating casing 15 is provided above the warm well casing 10 and mounted thereon, and this intermediate casing comprises inner and outer jackets or side walls 16 and 17, formed of wood or some other good heat insulating material. The inner and outer walls 16 and 17 are spaced apart for creating a dead air insulating space which may be filled with a suitable heat insulating material 18. The intermediate casing 15 is rectangular in horizontal cross section, and its outer wall 17 projects a slight distance below the inner wall 16 for telescoping engagement over the upper end of the casing 10. The inner wall 16 is seated upon the upper end of the warm wall casing, as shown. The intermediate casing 15 extends upwardly above the ground level L, as shown, and the upper end of the inner wall 16 extends above the outer wall 17 for a slight distance.

A horizontal bottom board or floor 19 rests upon the inner wall 16 of the intermediate casing, and is bounded at its opposite sides and rear end by rails 20 and 21 which telescope over the inner wall 16 and rest upon the upper end of the outer wall 17. A transverse half rail or cleat 22 is secured to the underside of the bottom board 19, adjacent to the front side of the casing 15, and this cleat rests upon the outer wall 17. The bottom board 19 may project a short distance forwardly of the front side of the hive at 23, to form an alighting edge or platform for the bees. The wooden bottom board 19 forms a cover or top for the warm well formed by the casings 10 and 15.

A rectangular bee hive body or housing 24 formed of wood or some other suitable material which is a good heat insulator, is mounted upon the rails 20 and 21 and forms the usual bee hive chamber containing a conventional frame 25. The bee hive body 24 is provided with a removable cover or lid 26, likewise formed of heat insulating material such as wood, and the numeral 27 designates a bar or entrance reducer mounted upon the bottom board 19, directly beneath the front wall of the housing 24. The bar 27 is provided in its lower edge with entrance openings 28, through which the bees enter and leave the hive, and at its longitudinal center with an air inlet opening or port 29. The entrance openings 28 also serve as air exhaust ports.

An air channel member 30 has its forward open end in registration with the port 29, and is mounted upon a plate 31, in turn rigidly secured to the bottom board 19. The plate 31 has a perforated area 32 registering with an opening 33 of the bottom board 19 near the front side of the bee hive, and the perforated area 32 places the opening 33 in communication with the interior of the channel member 30 and constitutes a filter or air strainer between the same. A depending vertical tube or pipe 34 has its upper end in communication with the opening 33 and carries a flange 35, rigidly secured to the under side of the bottom board 19 by screws or the like. A second depending vertical tube 36 is arranged near the rear wall of the bee hive and carries a flange 37 at its upper end, which is rigidly secured to the under side of the bottom board 19 adjacent to an opening 38 formed in the bottom board and arranged in registration with the bore of the tube 36. A perforated plate or filter 39 is mounted upon the bottom board 19 and covers the opening 38, as shown. The tube 36 is provided at its bottom end with a removable cap 40, forming a trap for particles of broken comb and like debris which may pass through the filter 39. The tubes 34 and 36 are preferably formed of copper or some other similar material which is an excellent conductor of heat, and an enlarged elongated heating bulb or cell 41 has one end connected with the lower end of the tube 34 and its opposite end connected in the side of the tube 36 near the longitudinal center of the latter. The bulb 41 is inclined and arranged centrally within the intermediate casing 15. Substantially the entire bulb 41 is disposed beneath the ground level L, as shown. The bulb 41 is also formed of copper or the like, so as to be an excellent conductor of heat, and the tube 34 and bulb 41 may be formed integral, if desired.

A heat conducting and radiating panel 42 of sheet metal or the like is mounted upon the bottom board 19 and extends between the side rails 20 and from the rear rail 21 to the plate 31. A large rectangular opening 43 is formed in the bottom board 19 between the tubes 34 and 36, and this opening exposes the major portion of the area of the under side of the panel 42 to contact with the air in the warm well.

The numeral 44 designates a drain pipe consisting of joints of pipe laid loosely in end-to-end closely spaced relation, and spaced below the bottom 11, whereby water from rain or melting snow which seeps into the ground in the vicinity of the warm well finds its way into the drain pipe and is carried off. The opening 12 forms a way of escape for any water which happens to get into the warm well, so that the same is maintained dry and its capacity is not reduced by water accumulating therein.

The operation of the bee hive is as follows:

Assuming initially that the temperature above ground is higher than that of the warm well below the ground level, the bee life in the hive will raise the temperature of the hive still higher. In such a situation, neither the automatic heating or ventilating means is in operation. In the course of time the temperature out-of-doors and above ground falls, and the temperature within the bee hive body 24 will also fall. While the subterranean temperature in frigid climates will remain approximately 40 degrees or more above zero, the outdoor temperature frequently falls to 40 degrees F. below zero. When the temperature in the housing 24 falls below the temperature of the warm well, the heating and ventilating means both begin to operate, and the operation of both is accelerated by any further fall in temperature within the housing 24. The operation of the heating means may be considered first, as follows.

The warm air of the warm well formed by the casings 10 and 15 being in contact with the heating panel 42 commences radiating heat and warming the bee hive chamber formed by the body or housing 24. Circulation of air in the warm well is established and continued as the warm air rises to contact the panel 42 and after giving up its heat, sinks down in the warm well for rewarming, and warmer air rises to take its place. Thus the temperature in the bee hive is maintained close to but never above the subterranean temperature.

Ventilation is effected by the air in the heating bulb 41 taking on the temperature of the warm well defined by the casing section 15 within which it is suspended. The air in the bulb 41 being warmer than the air in the bee hive housing 24, by its buoyancy, rises through the tube 36, opening 38 and perforated plate 39, into the housing 24. This rising air creates a vacuum in the bulb 41, and the vacuum induces air from the outside to enter the channel member 30, pass through the filter 32, port 33, tube 34 and into the bulb 41, where it is warmed and subsequently rises into the housing 24. Since cold air has little moisture carrying capacity, the fresh cold air from the outside brings very little moisture in with it. When it is warmed in the bulb 41, its moisture carrying capacity is greatly increased, and when it subsequently enters the housing 24, this warmed fresh air absorbs the excessive moisture therein. A quantity of air by volume approximately equal to that fed into the housing 24 is expelled therefrom through the entrance openings 28. The air thus expelled to make room for the incoming fresh air fed into the housing 24 is at the bottom of the housing, and thus the coldest air therein. However, it is warmer than the outside air, and therefore carries out of the hive more moisture than the fresh incoming air brings into the hive. Thus a continuous stream of fresh, dry air is fed into the hive, and the air fed into the hive is at a higher temperature than that expelled, whereby the hive is maintained in a fresh and dry condition and its temperature is elevated somewhat.

When the temperature in the bee hive body 24 rises, responsive to a rising of the outside temperature or from any other cause, operation of the heating and ventilating means slows down, and comes to a complete stop when the temperature in the housing 24 rises substantially to or above the temperature in the warm well. When the temperature in the housing 24 again drops below that of the warm well, the heating and ventilating means again commence operation.

In Figure 7 of the drawings, I have shown a modified form of the invention, wherein the ventilating means is employed alone without the heating means including the warm well. In this form of the invention, the rails 20' and 21' rest directly upon the ground, as shown, and the body or housing 24', including the floor 19', and associated elements are substantially the same as the corresponding parts shown and described in the first form of the invention, except that the large opening 43 and panel 42 are omitted. The casings 10 and 15 forming the warm well in the first form of the invention are likewise entirely omitted.

A bulb 41' of copper or the like, identical with the bulb 41, is embedded directly in the ground below the frost line, as shown, and tubes 34' and 36' are connected with the bulb 41' in the identical manner that the tubes 34 and 36 are connected with the bulb 41. The tubes 34' and 36' are longer than the tubes 34 and 36, so that the bulb 41' is positioned below the frost line, but the tubes 34' and 36' are otherwise identical with the tubes 34 and 36 and are connected with the floor 19' in the identical manner that the tubes 34 and 36 are connected with the floor 19. All other parts shown in Figure 7 are identical with the corresponding parts shown and described in connection with the first form of the invention.

In the form of the invention shown in Figure 7, the bulb 41' being embedded in the ground below the frost line is subject to the subterranean temperature and receives the natural warmth of the earth. The air within the bulb 41' is warmed and rises through the tube 36' into the housing 24'. This rising air creates a vacuum in the bulb 41' and the vacuum induces air from the outside to enter the tube 34' and bulb 41', where it is warmed and subsequently rises into the housing 24' to ventilate the same. This mode of operation is the same as that previously described in connection with the bulb 41 and associated elements in the first form of the invention.

I also contemplate omitting the ventilating means including the bulbs 41 and 41', and associated elements, and employing the bee hive heating means including the warm well formed by the casings 10 and 15 and the panel 42 alone.

It is to be understood that the forms of my invention herewith shown and described are to be taken as preferred examples of the same, and that various changes in shape, size and arrangement of parts may be resorted to, without departing from the spirit of the invention or the scope of the subjoined claims.

Having thus described my invention, I claim:

1. A bee hive comprising a casing embedded in the ground and extending below the frost line for forming a warm well having the natural warmth of the earth, a bee hive body mounted upon the casing and disposed above the ground level, a panel of heat transmitting material arranged between the bee hive body and casing for transmitting warmth from the warm well to the bee hive body, and ventilating means for the bee hive body including a heating cell of heat transmitting material suspended within the warm well and communicating with the bee hive body and the atmosphere.

2. A bee hive comprising a first casing section of heat conducting material embedded in the ground below the frost line, an intermediate casing section of heat insulating material mounted upon the first casing section and also embedded within the ground and having its upper end projecting above the ground level, a bee hive body mounted upon the intermediate casing section and including a floor formed of heat transmitting material and covering the upper end of the intermediate casing section, the first and intermediate casing sections constituting a warm well having substantially the temperature of the ground below the frost line, and ventilating means for the bee hive body including an air conduit of heat transmitting material suspended within the warm well and communicating with the bee hive body.

3. A bee hive comprising a casing embedded in the earth and forming a warm well retaining the natural warmth of the earth, a bee hive body mounted upon the casing and extending above the ground level, and a panel of heat transmitting material arranged between the bee hive body and casing for transmitting the warmth of the warm well to the bee hive body when the temperature within the bee hive body drops below that of the warm well.

4. A bee hive comprising a casing embedded in the earth and forming a warm well containing air having substantially the temperature of the earth below the frost line, a bee hive body mounted upon the casing and extending above the ground level, and ventilating means for the bee hive body including an air duct of heat transmitting material suspended in the warm well and arranged in communication with the interior of the bee hive body.

5. A bee hive comprising a casing embedded in the earth and forming a warm well having the natural warmth of the earth, a bee hive body mounted upon the casing and extending above the ground level and having an air exhaust opening, and ventilating means for the bee hive body including an air duct of heat transmitting material suspended within the warm well and arranged in communication with the interior of the bee hive body and atmosphere, whereby the warmth of the warm well causes fresh air to circulate through the bee hive body and exhaust through the exhaust opening.

6. A bee hive comprising a casing embedded in the earth and forming a warm well retaining the natural warmth of the earth, a bee hive body mounted upon the casing and extending above the ground level and having an air exhaust opening near its bottom, a panel of heat conducting material arranged between the bee hive body and casing for transmitting warmth from the warm well to the interior of the bee hive body, an air duct leading from the exterior of the bee hive body to the interior of the warm well, a second air duct leading from the interior of the warm well to the interior of the bee hive body, and a heating bulb of heat conducting material disposed within the warm well and connecting the first and second ducts.

7. A bee hive comprising a casing embedded in the earth and forming a warm well containing the natural warmth of the earth, a bee hive body mounted upon the casing and extending above the ground level and having a floor covering the warm well, the bee hive body being provided with air inlet and outlet openings above the ground level, an air conduit having one end connected with the air inlet opening and extending into the warm well and being formed at least in part of a material which is a good conductor of heat, the other end of the conduit being connected with the floor of the bee hive body and communicating with the interior of the same, and filter means connected with the conduit through which the air passes when flowing through the conduit.

8. A bee hive comprising a first casing section formed of heat transmitting material and embedded in the ground and extending below the frost line, an intermediate casing section formed of heat insulating material mounted upon the first casing section and embedded within the ground and extending above the frost line, a bee hive body mounted upon the intermediate casing section and extending above the ground level and having air inlet and outlet openings, and a conduit having one end connected with the air inlet opening of the bee hive body and extending into the intermediate casing section and being formed at least in part of heat transmitting material, the other end of the conduit being connected with the interior of the bee hive body.

9. A bee hive comprising a bee hive body having air inlet and exhaust openings, and ventilating means for the bee hive body including an air duct of heat transmitting material embedded in the ground below the frost line and subject to the natural warmth of the earth, the air duct having one end connected with the air inlet opening of the bee hive body and its other end open to the atmosphere so that the warmth of the earth induces fresh air to flow through the duct into the bee hive body.

10. A bee hive comprising a housing including a floor having an air inlet opening, the housing having an air outlet opening, a bulb formed of heat conducting material arranged within the earth below the frost line and subject to the natural warmth of the earth, a duct connected with one end of the bulb and leading to the air inlet opening of the floor, and a second duct connected with the other end of the bulb and leading to the atmosphere above the ground level.

11. A bee hive comprising a body portion having a floor formed of heat-conducting material, said body portion having air inlet and outlet openings, an elongated bulb of heat-transmitting material spaced below the floor of the body portion, a first tube connecting one end of the bulb and said air inlet opening, and a second tube connected with the other end of the bulb and communicating with the atmosphere, whereby fresh air may flow through the bulb to the interior of the bee hive body portion.

12. A bee hive comprising a body portion having a floor formed at least in part from sheet metal so as to be a good conductor of heat, the floor of the body portion having an air inlet opening near one side of the body portion and a second opening near the opposite side thereof, the body portion having a side wall provided with an exhaust opening near and above the floor of the body portion, passage means connected with said second opening and leading to the atmosphere, a sheet metal heat transfer bulb arranged directly under the sheet metal floor and spaced from the floor and extending for the major portion of the width of the body portion between the air inlet and second openings, and tubes connecting the opposite ends of the heat transfer bulb with said air inlet and second openings of the floor, whereby fresh air from the passage means may flow through the heat transfer bulb before entering the body portion by way of the air inlet opening.

CLARENCE S. BOWEN.

REFERENCES CITED

The following references are of record in the file of this patent:

UNITED STATES PATENTS

| Number | Name | Date |
| --- | --- | --- |
| 1,451,215 | Goodwin | Apr. 10, 1923 |
| 1,593,008 | Baumgartner | July 20, 1926 |
| 2,119,038 | Bell | May 31, 1938 |
| 2,178,176 | Lamm | Oct. 31, 1939 |
| 2,232,343 | Sauter | Feb. 18, 1941 |
| 2,564,215 | Slane | Aug. 14, 1951 |